(12) United States Patent
Van Riper et al.

(10) Patent No.: US 8,027,956 B1
(45) Date of Patent: Sep. 27, 2011

(54) SYSTEM AND METHOD FOR PLANNING OR MONITORING SYSTEM TRANSFORMATIONS

(75) Inventors: James E. Van Riper, Austin, TX (US); Clint Miller, Austin, TX (US); David K. Williams, Austin, TX (US)

(73) Assignee: TROUX Technologies, Austin, TX (US)

( * ) Notice: Subject to any disclaimer, the term of this patent is extended or adjusted under 35 U.S.C. 154(b) by 537 days.

(21) Appl. No.: 11/929,157

(22) Filed: Oct. 30, 2007

(51) Int. Cl.
*G06F 7/00* (2006.01)
*G06F 17/30* (2006.01)
*G06F 17/00* (2006.01)

(52) U.S. Cl. ........................ 707/649; 707/810
(58) Field of Classification Search ............... 712/227; 717/125; 704/1; 707/810, 649
See application file for complete search history.

(56) References Cited

U.S. PATENT DOCUMENTS

| | | | |
|---|---|---|---|
| 5,572,732 A | 11/1996 | Fant et al. | |
| 5,845,068 A | 12/1998 | Winiger | |
| 5,968,176 A | 10/1999 | Nessett et al. | |
| 6,226,792 B1 | 5/2001 | Goiffon | |
| 6,292,900 B1 | 9/2001 | Ngo et al. | |
| 6,442,557 B1 | 8/2002 | Buteau et al. | |
| 6,509,898 B2 | 1/2003 | Chi | |
| 6,529,909 B1 | 3/2003 | Boman-Amuah | |
| 6,611,838 B1 | 8/2003 | Ignat et al. | |
| 6,662,188 B1 | 12/2003 | Rasmussen et al. | |
| 7,103,171 B1 | 9/2006 | Annadata et al. | |
| 7,124,180 B1 | 10/2006 | Ranous | |
| 7,428,546 B2 | 9/2008 | Nori et al. | |
| 7,523,128 B1 | 4/2009 | Miller et al. | |
| 7,558,790 B1 | 7/2009 | Miller et al. | |
| 7,644,432 B2 | 1/2010 | Patrick et al. | |
| 7,664,712 B1 | 2/2010 | Duvall et al. | |
| 7,698,683 B1 | 4/2010 | Miller et al. | |
| 7,822,710 B1 | 10/2010 | Miller et al. | |
| 7,890,545 B1 | 2/2011 | Cason, Jr. et al. | |
| 2003/0009487 A1 | 1/2003 | Prabakaran et al. | |
| 2003/0088551 A1 | 5/2003 | Tong | |
| 2003/0110253 A1 | 6/2003 | Anuszczyk | |
| 2003/0177481 A1 | 9/2003 | Amaru | |
| 2003/0187826 A1 * | 10/2003 | Kennedy et al. | 707/1 |
| 2003/0208367 A1 | 11/2003 | Aizenbud-Reshef | |

(Continued)

OTHER PUBLICATIONS

U.S. Patent and Trademark Office, Office Action issued in U.S. Appl. No. 11/198,649 mailed Feb. 27, 2009, Clayton Duvall, 11 pages.

(Continued)

*Primary Examiner* — Brent Stace
*Assistant Examiner* — Sabana Rahman
(74) *Attorney, Agent, or Firm* — Sprinkle IP Law Group

(57) ABSTRACT

Embodiments provide systems and methods for planning or monitoring system transformations. One embodiment of a method for planning or monitoring the transformation of a system includes developing one or more states, each state representing a system and associated with data structures representing entities comprising the system, wherein the states are ordered in a succession of states to form a scenario modeling the transformation of the system. States can be populated by reflecting one or more data structures or properties of data structures across one or more states. The method can further include collecting data associated with the system at intervals and reflecting the collected data across states. Data structures may be contained in a repository and collected data may be used to update the repository and data structures contained in the repository. A modeling tool may be utilized to display data structures in the repository according to different representations.

18 Claims, 8 Drawing Sheets

U.S. PATENT DOCUMENTS

| | | | |
|---|---|---|---|
| 2003/0212640 | A1 | 11/2003 | Andresen |
| 2004/0002818 | A1 | 1/2004 | Kulp |
| 2004/0049509 | A1 | 3/2004 | Keller |
| 2004/0059943 | A1 | 3/2004 | Marquet et al. |
| 2004/0073655 | A1 | 4/2004 | Kan |
| 2004/0111513 | A1 | 6/2004 | Shen |
| 2004/0225791 | A1 | 11/2004 | Keskar |
| 2004/0243835 | A1 | 12/2004 | Terzis et al. |
| 2004/0260706 | A1* | 12/2004 | Anonsen et al. ............. 707/100 |
| 2005/0033762 | A1 | 2/2005 | Kasravi |
| 2005/0138039 | A1 | 6/2005 | Hagen |
| 2005/0203920 | A1 | 9/2005 | Deng |
| 2006/0085837 | A1 | 4/2006 | Pesati et al. |
| 2006/0106796 | A1 | 5/2006 | Venkataraman |
| 2006/0136437 | A1 | 6/2006 | Yamasaki |
| 2006/0167927 | A1 | 7/2006 | Edelstein |
| 2006/0195460 | A1 | 8/2006 | Nori |
| 2006/1021248 | | 9/2006 | Kennis et al. |
| 2006/0253709 | A1 | 11/2006 | Cheng et al. |
| 2006/0277022 | A1 | 12/2006 | Pulfer |
| 2006/0294148 | A1 | 12/2006 | Brunet |
| 2007/0143604 | A1 | 6/2007 | Arroyo et al. |
| 2007/0180490 | A1 | 8/2007 | Renzi et al. |
| 2007/0192415 | A1 | 8/2007 | Pak |
| 2007/0255841 | A1 | 11/2007 | Chong |
| 2007/0282916 | A1* | 12/2007 | Albahari et al. ............. 707/200 |
| 2008/0120362 | A1* | 5/2008 | Kapoor et al. ............... 709/203 |
| 2010/0169380 | A1 | 7/2010 | Miller et al. |

OTHER PUBLICATIONS

Gomik, "UML Data Modeling Profile", 2002, Rational corp., TP162, pp. i-ii, 1-11, May 2002.

CBOP et al., "A UML Profile for Enterprise Distributed Object Computing—Joint Final Submission—Component Collaboration Archicatures (CCA)", OMG Document No. ad/2001-08-19, http://enterprisecomponent.com/docs/EdocCCA.pdf, 169 pages, Feb. 2002.

Office Action mailed Aug. 4, 2009 for U.S. Appl. No. 10/802,304, 10 pages.

Office Action mailed Aug. 17, 2009 for U.S. Appl. No. 11/117,039, 27 pages.

Office Action mailed Aug. 28, 2009 for U.S. Appl. No. 11/095,323, 16 pages.

Office Action mailed Sep. 11, 2009 for U.S. Appl. No. 11/805,873, 10 pages.

U.S. Patent and Trademark Office, Office Action issued in U.S. Appl. No. 11/117,039 mailed Feb. 12, 2009, Eric Maginniss, 27 pages.

U.S. Patent and Trademark Office, Office Action issued in U.S. Appl. No. 11/095,323 mailed Feb. 17, 2009, William C. Cason Jr., 14 pages.

U.S. Patent and Trademark Office, Office Action issued in U.S. Appl. No. 10/802,304, mailed Feb. 17, 2009, Clint Miller, 12 pages.

Office Action issued in U.S. Appl. No. 10/803,133 dated Oct. 4, 2006.

Office Action issued in U.S. Appl. No. 10/803,133 dated May 17, 2007.

Office Action issued in U.S. Appl. No. 10/803,133 dated Nov. 2, 2007.

Office Action issued in U.S. Appl. No. 10/802,304 dated Jan. 9, 2008.

Office Action issued in U.S. Appl. No. 10/802,304 dated Jun. 30, 2008.

Office Action issued in U.S. Appl. No. 10/803,133 dated May 28, 2008.

Office Action issued in U.S. Appl. No. 10/802,178 dated Aug. 19, 2008.

Office Action issued in U.S. Appl. No. 11/095,323 dated Mar. 3, 2008.

Office Action issued in U.S. Appl. No. 11/095,323 dated Aug. 10, 2007.

Office Action issued in U.S. Appl. No. 11/095,323 dated Aug. 20, 2008.

Office Action issued in U.S. Appl. No. 11/117,039 issued Aug. 20, 2008.

Office Action issued in U.S. Appl. No. 10/802,304 issued Jun. 18, 2007.

Office Action issued in U.S. Appl. No. 10/802,178 issued Sep. 5, 2007.

Office Action issued in U.S. Appl. No. 10/802,178 issued Mar. 3, 2008.

Office Action issued in U.S. Appl. No. 11/198,649 issued Apr. 29, 2008.

Office Action issued in U.S. Appl. No. 10/803,133 Issued Oct. 7, 2008.

Muller, Robert, "Database Design for Smarties Using UML for Data Modeling", Morgan Kaufmann Publishers, 265 pages, 1999.

Office Action mailed Mar. 1, 2010 in U.S. Appl. No. 11/095,323, 24 pages.

Office Action mailed Mar. 15, 2010 in U.S. Appl. No. 11/117,039, 31 pages.

Office Action mailed Mar. 16, 2010 in U.S. Appl. No. 11/805,873, 13 pages.

Du et al., "XML structures for relational data," Web Info. Sys. Engineering, 2001. Proceedings of the Second Int'l Conf. on (0-7965-1393-X), Dec. 3-6, 2001, vol. 1; p. 151-160 download: http://ieeexplore.ieee.org/stamp/stamp.jsp?isnumber+21506&arnumber=996476&punumber=7824.

Notice of Allowance for U.S. Appl. No. 11/805,873, mailed Aug. 31, 2010, 6 pgs.

Office Action for U.S. Appl. No. 11/805,002, mailed Feb. 2, 2011, 12 pgs.

* cited by examiner

SYSTEM AND METHOD FOR PLANNING OR MONITORING SYSTEM TRANSFORMATIONS

TECHNICAL FIELD

Embodiments of the systems and methods presented herein relate to modeling the transformations of systems. More particularly, embodiments relate to systems and methods for planning or monitoring transformations of systems using a series of representations of the system. Even more particularly, embodiments regard systems and methods for planning or monitoring transformations of systems by using a series of representations of the system which may be updated over time.

BACKGROUND

Natural and manmade systems include interrelated entities working together in typically complex manners. System representations (e.g. models of systems and the interrelations between entities in the systems) provide an abstraction of the system for better understanding of the entities within the system and the relationships between entities. Representations are used in a variety of disciplines to identify problems or inefficiencies in a particular system, anticipate failures in the system so that the system can be reconfigured or provide insight as to why a particular failure occurred. In the field of architecture, for example, computer representations aid architectural engineers in visualizing how structural members of a building physically fit together and how the members statically and dynamically interact under various conditions. These representations can help the engineer minimize the potential for catastrophic building failure.

It may be desired to transform (e.g. modify or change) systems in accordance with an initiative (e.g. a goal, mission, plan, etc.) such that a desired system is achieved which comprises desired entities which are interrelated through desired relationships. In order to facilitate the transformation of a system in accordance with an initiative, a representation of the system or the desired system may be developed. For example, it may be desired to transform an enterprise such as a company or other organization or sub-organization. Accordingly, an individual such as an enterprise architect may develop a representation of a desired enterprise. The desired enterprise may be optimized for efficiencies or cost management. For example, when an enterprise is formed from a merger, it may be desired to integrate two redundant divisions in the enterprise to optimize efficiencies and reduce costs. To model such a transformation, an enterprise architect may develop a representation of the desired division.

Systems often evolve in a hodge-podge manner, with various entities such as, for example, computers and software programs being deployed at different times, leading to a highly heterogeneous system. Without careful planning, the installation of entities such as new computers and software applications can lead to instability in the system, causing conflicts within the system and other problems. To further complicate matters, systems may be prone to communication breakdowns, incompatibility issues and a variety of other problems. An error or instability in one portion of the system can, at one end of the spectrum, cause annoyance for a small number of people and, at the other end, cripple the system.

Because systems may be augmented or evolve, modeling these systems to identify or predict problems can be time consuming and difficult. In particular, identifying and managing changing relationships between entities in a system is problematic. Two primary methods are currently employed to model systems. The first method involves diagramming the system using a computer drafting program such as Microsoft VISIO (Microsoft and VISIO are trademarks of Redmond, Wash. based Microsoft Corp.) or listing entities using a spreadsheet. The network diagram or spreadsheet provides an inventory of entities comprising a system. This solution is generally insufficient for managing relationships between entities, particularly in large systems, because the graphical representations or spreadsheet data must be manually deciphered to derive relationships. Another problem with modeling system through documents is that potentially hundreds of personnel are needed to update those documents. If there are a large number of documents it can be difficult to cross-reference the documents, provide version control for the documents and control document workflow among multiple authors.

The second solution involves maintaining a relational database that includes entries for machines and software programs. The relational database can define relationships through associations between database entries according to a database schema, with the database schema being based on known relationships. As new relationships develop or old relationships disappear, the database schema, and potentially the SQL statements required to utilize the underlying data, must typically be updated. This can be a time consuming and error prone process.

SUMMARY

This disclosure describes systems and methods for planning, driving or monitoring system transformations. More particularly, one embodiment of a method for planning or monitoring the transformation of a system includes developing one or more states, each state representing a system and associated with data structures representing entities comprising the system. States are ordered in a succession to form a scenario which culminates in a state representing the desired transformation of the system. The "last" state in a scenario may represent a desired configuration of the system. States can be populated by reflecting one or more data structures or properties of data structures across one or more states. The method can further include collecting data associated with the system at intervals over time and reflecting the collected data across one or more states. Data structures may be contained in a repository and collected data may be used to update the repository and data structures contained in the repository. A modeling tool may be utilized in conjunction with the repository to display data structures in the repository to a user in one or more forms or representations.

Embodiments can include computer programs containing computer instructions executable by a computer processor to effect the above described method or a portion or portions thereof. The computer programs can be contained on computer readable medium or on multiple computer readable mediums. In one embodiment, a computer program can be run on multiple computer processors substantially simultaneously.

The succession of states comprising a scenario allows a user to plan the orderly transformation of a system over time. Each state can represent progress towards the transformation of a system and states can be arranged such that changes to a system occur at convenient periods or when resources are available to effect the changes. For example, a system represented by a state may be under-utilized for a known period (e.g. at the end of a business cycle) and it may be convenient to transform certain entities of the system during this period.

A state, representing the system and corresponding to the period of under-utilization may model the transformation of these entities of the system.

Data collection can be utilized in the context of a scenario to allow a user to monitor the progress of the transformation of a system. For example, collected data may pertain to a system under transformation and actual modifications or updates made to the system may be part of the collected data. When the collected data is displayed to a user, the user may be able to determine the progress of the transformation modeled by a scenario. For example, differencing reports may be generated or compiled using collected data which list the differences between the collected data and a desired state in a scenario such that the progress of a transformation modeled by the scenario can be determined. In another example, collected data may be reflected across states such that the reflected data is displayed in the context of states and data structures representing entities of systems represented by the states. The user can view the collected data in the context of a state to determine if the state has been achieved.

These, and other, aspects of the systems or methods disclosed herein will be better appreciated and understood when considered in conjunction with the following description and the accompanying drawings. The following description, while indicating various embodiments of systems or methods and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE FIGURES

A more complete understanding of embodiments and the advantages thereof may be acquired by referring to the following description, taken in conjunction with the accompanying drawings in which like reference numbers indicate like features and wherein.

DETAILED DESCRIPTION

Embodiments are illustrated in the FIGURES, like numerals being used to refer to like and corresponding parts of the various drawings.

A system may comprise various entities which may be interrelated through relationships between or among the entities. A system may evolve or change as the entities comprising the system change or the relationships between and among entities change. In addition, the system may change as entities may be added or removed from the system.

Figure 1:
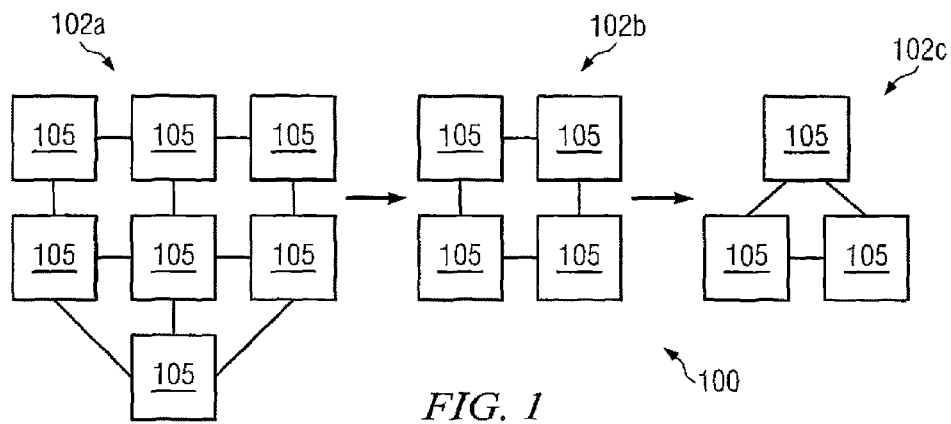
FIG. 1 is a block diagram of one embodiment of a transformation of a system.

Thus, embodiments of systems may be comprised of entities and relationships may exist between and among the entities comprising a system. It may be desired to transform a system by changing or modifying the entities comprising a system and the relationships between the entities themselves or adding or removing entities. For example, in a system such as a corporation, it may be desired to simplify the corporation by reducing the entities (e.g. divisions, sections, departments, etc.) comprising the corporation. For example, an enterprise architect may desire to optimize an enterprise such as a corporation by removing unprofitable entities within the corporation. It may also be desired to simplify and streamline the relationships (e.g. dependencies, interrelations, etc.) between the entities. FIG. 1 depicts transformation 100 of a system 102 which is comprised of multiple interrelated entities 105. As can be seen from FIG. 1, in transformation 100, system 102 becomes "simpler" as the number of entities 105 in system 102 is reduced from 7 entities in system 102a to 4 entities 105 in system 102b and finally 3 entities 105 in system 102c. As can further be seen from FIG. 1, the relationships between entities 105 become simpler as transformation 100 progresses. That is, the number of relationships between entities is reduced such that the number of relationships in the system is reduced, allowing for a more readily "comprehensible" system. Transformation 100 is only one example of a transformation. In other transformations, systems may become more complex over time or evolve in other ways. While system 102 of FIG. 1 is a simple system, in larger systems comprising multiple entities with relationships between the entities, managing the transformation of a system such that the transformation culminates in a desired system in an orderly progression without interruptions, regressions or system failures is an important task.

Embodiments provide a method and system for designing or monitoring the transformation of one or more systems. One embodiment can comprise a transformation engine associated with a data repository. The transformation engine can allow one or more users to develop desired states of systems where the states are representations of a system at a point in time and different states may be developed for different points or periods in time. States may be developed from a universe of representations which contains representations of all, or a subset of, the entities of a system. A set of states representing a system at different points in time may be referred to as a scenario. Utilizing a scenario, the transformation of a system may be designed. For example, a scenario may be developed wherein the set of states in the scenario are ordered such that each state is nearer to a desired configuration of the system in some aspect than a preceding state. Eventually, a state in the set of states will represent the desired configuration of the system such that the succession of states models a desired system transformation.

Because it may be desirable to transform one or more systems (e.g. a system or portion or portions thereof) in different manners, multiple scenarios may be developed, each scenario modeling the transformation of a system or part of a system. Multiple scenarios may be used when several alternatives are being considered. Only one of the scenarios may actually be implemented. If multiple systems are being transformed, the transformation may be modeled using a single scenario. A collection or set of scenarios may be referred to as an initiative. In one embodiment, scenarios of an initiative may model alternative transformations of the same system. Transformations modeled by scenarios may be effected in parallel or in series or in any other order.

Figure 2:
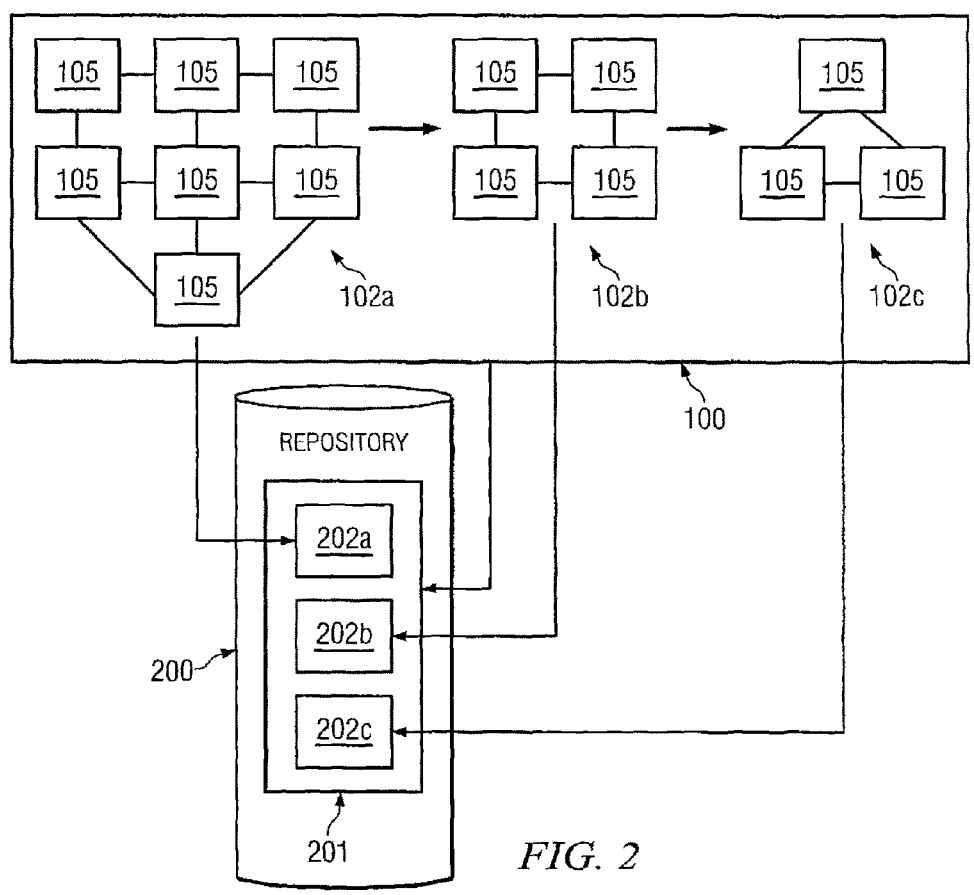
FIG. 2 is a diagrammatic representation of one embodiment of a transformation of a system.

Initiatives, scenarios and states may be represented as structures or components in a database or other repository. For example, an initiative may exist as a structure in a database and the initiative structure may further comprise or be associated with other structures, the other structures including scenarios comprising the initiative. In turn, each scenario structure may comprise or be associated with structures for the states comprising the scenario. In addition, entities and relationships between entities in a system may be represented as structures. These structures may be used to develop states. For example, a state representing a system made of entities may include structures representing the entities in the system such that the state structure representing the system references structures representing entities in the system. Structures representing entities may have one or more properties having values which correspond to the properties of represented entities. Thus, a transformation may be represented or modeled by structures which may be contained in a database. For example, as shown in FIG. 2, transformation 100 of FIG. 1 can be represented by scenario structure 201 contained in database 200. As further shown in FIG. 2, scenario structure 201 may comprise or be associated with additional structures, e.g. states 202a-202c, which are structures representing systems 102a-102c respectively. While not shown in FIG. 2, scenario structure 201 may be part of an initiative structure representing one or more scenario structures. Thus, initiatives, scenarios and states may be interrelated structures in a database or other data repository.

As discussed above, states may comprise structures representing entities in the system represented by the states. Structures representing entities in a system may be contained in a repository such that states may be developed by associating structures representing entities in the system with the states representing the system.

Figure 3:
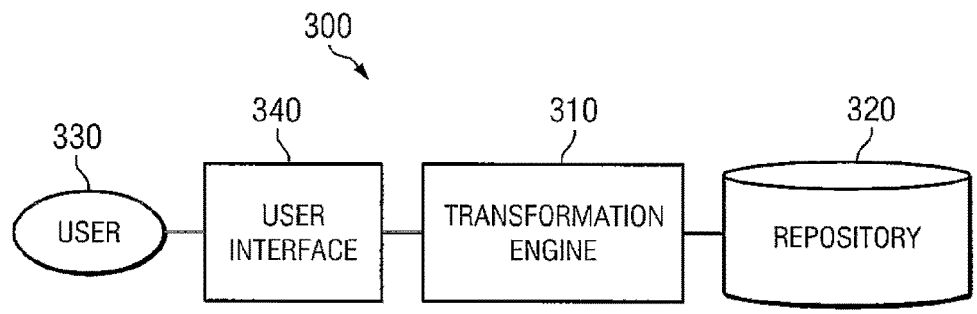
FIG. 3 is a block diagram of one embodiment of an apparatus operable to develop, create, store or manipulate representations of systems.

Attention is directed to FIG. 3. FIG. 3 is a diagrammatic representation of one embodiment of an apparatus for developing models or representations of transformations of systems. In apparatus 300 of FIG. 3, transformation engine 310 is associated with repository 320 and user interface 340. Transformation engine 310 is operable to access repository 320. Repository 320 can contain structures representing logical or physical entities and as such may operate as a universe from which states can be developed using structures contained in repository 320. User 330 interfaces with transformation engine 310 via user interface 340. In one embodiment, user interface 340 is a graphical user interface (GUI).

More specifically, user 330 can interface with transformation engine 310 via user interface 340 to develop one or more initiatives, each initiative containing (e.g. referencing or associated with) one or more scenarios. A scenario can comprise (e.g. reference or be associated with) a series of states arranged in a succession. Each state may represent one or more systems at a particular time and each state in a scenario may differ from the states in the scenario which proceed it. Thus, a scenario can contain a succession of states, the states representing the state of a system at various points in a desired transformation.

Figure 4:
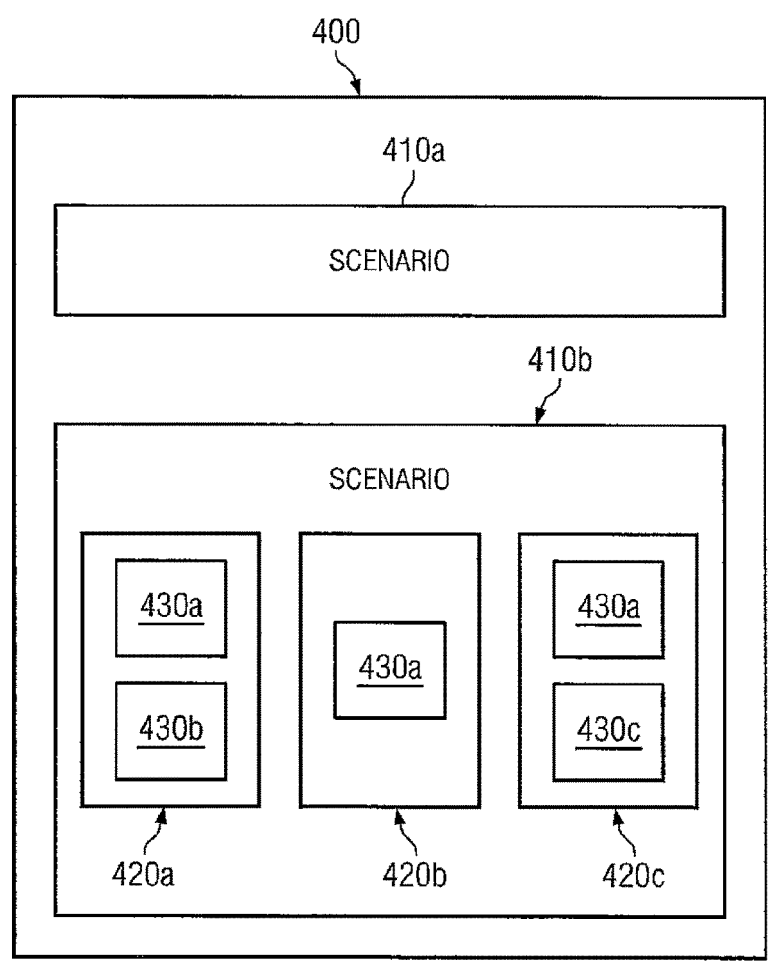
FIG. 4 is a diagrammatic representation of one embodiment of an initiative.

For example, if a desired transformation included removing and replacing entities in a system, one scenario might represent the removal or replacement of one or more entities in the system. An initiative containing such a scenario may exist as a structure in a database and the scenario may be a structure within, or referenced by, the initiative. States comprising the scenario may exist as structures within the scenario structure. States themselves may comprise structures existing in a database or developed to represent entities in a system. FIG. 4 is a diagrammatic representation of one embodiment of an initiative 400 as contained in a repository. In FIG. 4, initiative 400 comprises scenarios 410a and 410b. Scenario 410b comprises states 420a-420c. States 420a-420c may each represent the same system at different points in time such that scenario 410b models the transformation of the system represented by states 420. States 420 may be populated by structures 430a-430c. Structures 430a-430c represent entities which comprise the system represented by states 420. State 420a comprises structures 430a and 430b, each representing entities or relationships between entities in a system at a point in time. State 420b represents the system at a point in time subsequent to state 420a and contains structure 430a but not structure 430b, indicating that at the point in time represented by state 420b, the entity or relationship represented by structure 430b will no longer be part of the system modeled by state 420b. State 420c represents the system at a point in time subsequent to both states 420a and 420b. The system represented by state 420c contains entities represented by structures 430a and 430c: consequently, state 420c comprises structures 430a and 430c. As can be seen from FIG. 4, scenario 410b models a transformation of a system where an entity or relationship (represented by structure 430b) is removed and replaced by another entity or relationship (represented by structure 430c).

When repeated in the context of multiple states, as shown above, structures may represent the same entity or relationship at different points in time such that changes in an entity or relationship over time may be represented as part of the transformation represented by a succession of states. For example, states 420a-420c of FIG. 4 each contain structure 430a. While structure 430a represents the same entity or relationship in states 420a-420c, the entity or relationship may change from state to state such that structure 430a is different across states 420a-420c. To enable the scalable development of states, structures may be reflected across states, that is, variants of a structure contained in a repository may be instantiated with respect to multiple states. For example, structure 430a may be instantiated in each of states 420a-420c through the reflection of state 430a from one state to the next. In a further embodiment, one or more structures representing entities may be updated with current or up to date data associated with the entities and the data reflected across one or more states such that one or more states in a scenario may contain current or up to date structures.

Figure 5:
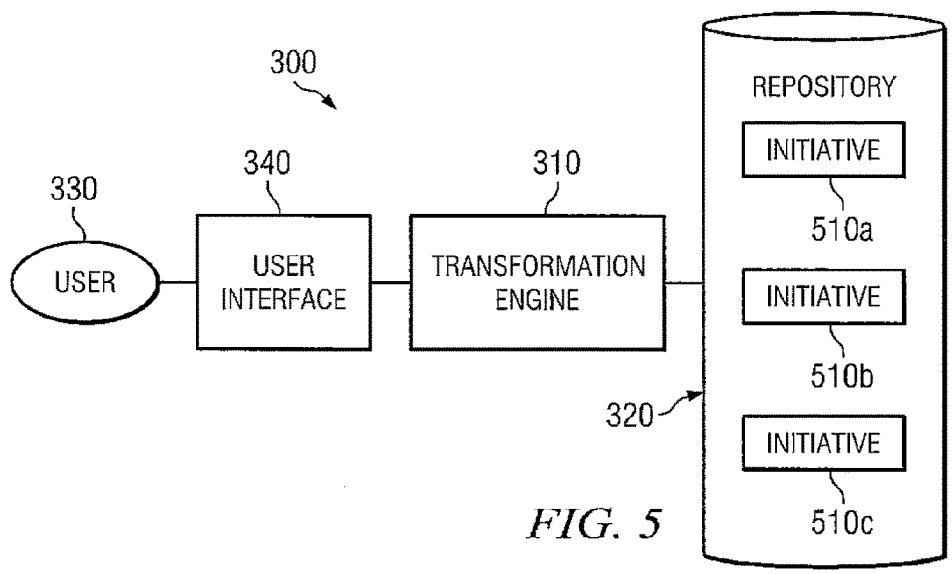
FIG. 5 is a block diagram of one embodiment of an apparatus operable to develop, create, store or manipulate representations of systems.

FIG. 5 is a diagrammatic representation of apparatus 300 which may be used to develop representations of transformations of systems. In apparatus 300 of FIG. 5, repository 320 can contain multiple initiatives such as initiatives 510. Transformation engine 310 is associated with repository 320 and user interface 340 and may comprise a computer program operable to interface between repository 320 and user interface 340. Initiatives 510 can be accessed by user 330 utilizing user interface 340 and developed by user 330 using user interface 340 utilizing representations contained in repository 320. For example, because repository 320 can contain representations of entities or relationships of a system, the transformation of the system can be modeled by a succession of states populated in part by representations contained in repository 320. Multiple states representing a desired system at different times can be developed and organized to form a scenario. Such a scenario might be, for example, a scenario of initiative 510a.

In one embodiment, repository 320 of FIG. 5 is part of a database which allows the representation of any logical or physical entity and the associations and dependencies between these entities. Components may be used to represent the entities while relationships may be used to represent the associations and dependencies between the entities. Components or relationships can be referred to as data structures. Data structures may have a set of associated properties. The term property is intended to mean a characteristic associated with a component or a relationship. A property may have a name and a value associated with it, and components of the same type may have different values for the same property. The term type is intended to mean a category of a relationship or a component. All relationships or components of the same type will have the same properties, though each instance of a component or a relationship may have different values for those properties. For example, a component type named "ComputerType" may be defined, having the properties of "RAM" and "OSType". Each instance of component type "ComputerType" will have the properties "RAM" and "OSType", however in one instance the value of "RAM" may be 4 megabytes, while in another instance the value of "RAM" may be 8 megabytes. A system of types may be utilized with a generic data model to define a hierarchy of data structures for use with a particular category of environments. The data structures associated with a generic data model may be stored utilizing a table schema which does not change with the addition of new data structures or types of data structures. A query language may be utilized with a generic data model to search specific applications of the generic data model according to specific criteria. In one embodiment, the query language can comprise a version of structured query language (SQL) or other database language. In one embodiment, the above-described database can be used as the central repository or database into which data from the one or more data source(s) can be gathered. The above-described database is referred to as the Troux database and is described in greater detail in U.S. patent application Ser. Nos. 10/802,304, entitled "Method and System for a Generic Data Model" and 10/803,133, entitled "Method and System for Querying an Applied Data Model", both of which are hereby incorporated by reference.

In one embodiment of the Troux database, the Troux database can be used in conjunction with a method or system of data collection wherein data held in various data sources according to a variety of formats may be collected in the Troux database such that the data contained in the Troux database may be periodically or continually updated. Specifically, embodiments of a data collection system used in conjunction with the Troux database may extract data from various data sources and transform the data into a format corresponding to the Troux database and load the transformed data into the Troux database at intervals such that the data in the Troux database is updated. Thus, data structures in the Troux database may contain updated or current data regarding a system. The above-described method and system is described in greater detail in U.S. patent application Ser. No. 11/805,873, entitled "System and Method for Data Collection", which is hereby incorporated by reference. When used in conjunction with embodiments of systems and methods of data collection as described in the above reference, the Troux database may act as a continuously updated universe containing data structures which represent entities of a system.

Initiatives and scenarios comprising initiatives may exist as data structures in the Troux database. Likewise, states comprising scenarios may exist as data structures in the Troux database. Data structures representing entities and relationships between entities may be used to develop states representing systems containing entities. More specifically, a state can comprise one or more data structures representing entities. When designing a transformation of a system, states may be developed which contain data structures which do not correspond to entities or relationships currently in the system or whose properties differ from the current properties of the entities or relationships in the system. For example, in the course of a transformation of a corporation, it may be desired to add a new division. A user may create a data structure representing the desired division and add the data structure to a state corresponding to a point in time when the division should be a functioning part of the corporation. States containing data structures which represent such currently non-existent entities or relationships, or states which contain data structures whose properties differ from the current properties of corresponding entities or relationships are often developed as part of designing a scenario modeling the transformation of a system into a desired system. Because multiple variations of a data structure representing the same entity or relationship may exist across multiple states and because states may contain data structures which represent desired entities or relationships which do not exist, it may be desirable to correlate data structures with states and segregate states and their constituent data structures from other states and data structures. In the context of the Troux database, this may be achieved through the utilization of blueprints.

Figure 6:
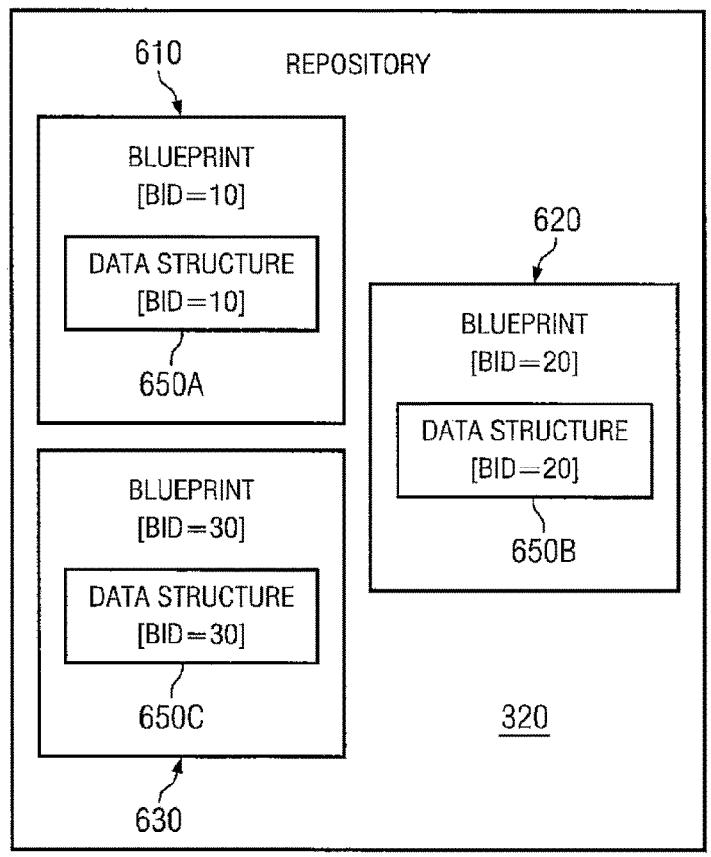
FIG. 6 is a diagrammatic representation of one embodiments of a repository.

In one embodiment of the Troux database, a repository of the Troux database (e.g. repository 320 of FIG. 5) may have one or more sections called blueprints. Specifically, blueprints may be used to segregate states such that conflicts do not occur between or among states and data structures associated with those states. Different blueprints may be associated with one or more states or one or more data structures. FIG. 6 depicts repository 320 containing blueprints 610, 620 and 630. Blueprints 610, 620 and 630 may each contain a state or data structure which differs from a state or data structure contained in the other blueprints of blueprints 610, 620 and 630. For example, because states in a scenario may differ from one another, different states in a scenario may be saved in a different blueprint. In one embodiment, each blueprint contains a unique state relative to the other blueprints in the database and each blueprint contains a non-overlapping set of data structures relative to the other blueprints.

Blueprints may each have a blueprint identity (BID) which is unique relative to other BIDs of other blueprints. A BID may be used to uniquely identify individual blueprints and associate states and data structures with a unique blueprint. States or data structures within individual blueprints may be correlated by a BID. For example, as shown in FIG. 6, the BID of data structure 650A in blueprint 610 is 10, the BID of data structure 650B in blueprint 620 is 20 and the BID of data structure 650C in blueprint 630 is 30, correlating the data structures with the corresponding blueprint. Properties of a data structure may be associated with the BID of the blueprint containing the data structure. Thus, the BID for each property may be the same as the BID of the data structure containing the property.

Figure 7:
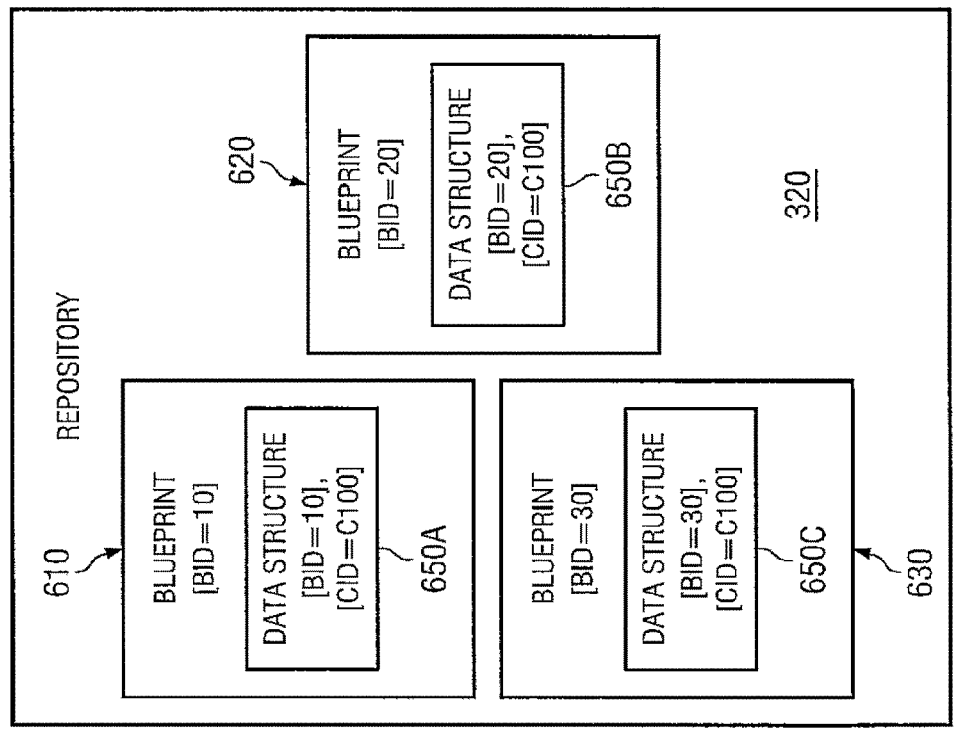
FIG. 7 is a diagrammatic representation of one embodiment of a repository.

Because states are comprised of data structures, and the data structures or the properties of the data structures may vary from state to state, data structures or properties of data structures in each blueprint may be different. To identify data structures as being related despite changes in the properties of a data structure (e.g. name, relationships to other data structures of any other property change), across different blueprints, each related data structure may be assigned a correlating ID (CID) that is consistent across blueprints. FIG. 7 depicts repository 320 containing blueprints 610-630. Each blueprint contains a data structure 650. Blueprint 610 contains data structure 650A which is one variant of data structure 650, blueprint 620 contains data structure 650B which is one variant of data structure 650 and blueprint 630 contains data structure 650C which is one variant of data structure 650. Data structures 650A, 650B and 650C may differ from one another in one or more properties. To correlate data structures 650A, 650B and 650C, the data structures may be assigned a correlating ID (CID) C100 which is common to all the data structures in each blueprint and can thus be used to identify that data structures 650A, 650B and 650C are associated with each other (e.g. are variants of each other across states). Similarly, properties of a data structure may also be associated with the CID of the data structure, thus properties of a data structure may be correlated across blueprints or states.

Because each data structure has a corresponding BID and CID, each data structure can be identified with regard to a state utilizing the corresponding BID and across multiple states utilizing the corresponding CID, this set of correlations between data structures and states allows data structures to be uniquely identified in the context of states. Because each property is associated with a data structure that has a BID and CID, each property can be identified with regard to a state and across multiple states. This set of correlations between properties and states allows properties to be uniquely identified and identified in the context of states.

In one example, in accordance with an initiative, it may be desirable to transform a system into a different or more efficient system. The transformation may be planned by designing scenarios to effectuate the initiative, the scenarios may each concern one or more aspects, elements or entities of the system to be transformed by the initiative.

Figure 8:
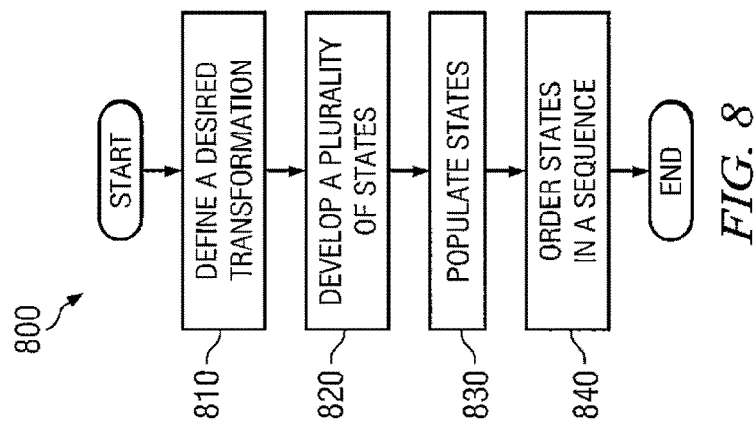
FIG. 8 is a flow chart of one embodiment of a method for developing scenarios.

FIG. 8 contains a flow chart 800 illustrating one method for designing a scenario which sets forth a plan or methodology for transforming a set of entities in a system wherein the plan culminates in the entities or relationships between or among the entities within the system being transformed in accordance with the scenario. At step 810, a desired transformation is defined. Defining a transformation may include determining a desired set of entities and the relationships between the entities. Defining a transformation may further include determining a sequence of transformation which avoids any issues (e.g. failure, resource limitations, etc.) arising. At step 820, a plurality of states, each state corresponding to a desired system at different moments or periods over time, are developed. Included in the plurality of states developed at step 820 is a state representing the desired final configuration of the system upon the completion of the transformation to be effectuated. At step 830, the states are populated with data structures representing entities or relationships of the system. Populating a state may comprise developing data structures representing entities or relationships, or reflecting data structures into the state. At step 840, the plurality of states are ordered in a succession which progresses towards and culminates in the state which represents the desired final configuration of the system upon the completion of the transformation of the system.

Because data structures in a repository, i.e. the Troux database, may represent entities or relationships of a system, a repository can act as a universe containing representations (i.e. data structures) of entities or relationships comprising a system and data structures in the repository can be used with a transformation engine to develop (e.g. populate) a succession of states modeling the transformation of the system.

For example, a user can use a UI to access a transformation engine and design a succession of states and order the succession of states to model the transformation of a set of entities of a system. To do this, a user may develop states representing sets of entities or relationships utilizing data structures representing the entities or relationships. More specifically, data structures in the repository may be used to populate a state such that the state is associated with or comprises the data structures populating it. For example, using a graphical user interface, a user can obtain a set of data structures representing specific entities from the repository and create a state comprising instantiations of those data structures. The data structures and the properties of the data structures in the state may be modified or augmented as desired to create a state which represents the desired or intended system for a point in time. A similar process may be used to develop other states regarding the same system. The states may each represent the system at a different moment in time. The states can be ordered in a succession such that a succession of states models a transformation of a system in accordance with a scenario of an initiative.

By way of further example, a state can be developed which contains data structures. The state may contain a subset of the data in the repository and may provide a template from which to develop other states. For example, a state and the data structures comprising the state may be modified or augmented as desired to develop other states. The state may be contained in a blueprint in a repository and other states developed from the state may be contained in different blueprints in a repository such that each state uniquely corresponds to a blueprint. States and data structures comprising states may have a corresponding BID such that data structures comprising a particular state can be identified by the corresponding BID. Data structures may have a corresponding CID, such that instantiations of data structures may be correlated across states. That is, a CID allows a data structure existing in one or more states to be uniquely identified across states.

In one embodiment, reflection may be used to populate one or more states or provide properties for one or more data structures in one or more states. Data structures, and properties of data structures, may be reflected across states to populate states and provide properties for data structures comprising states, respectively. In one embodiment of reflection, the universe described above can be used as a basis for reflection of data structures and properties of data structures across states. The universe may comprise a set of data structures which represent entities or relationships comprising the system to be transformed, where the transformation is modeled by a scenario. A user may create a series of states for the scenario and one or more data structures in the universe may be reflected across the states in the scenario. In one embodiment, one or more properties of the data structures in the universe can be reflected across the states such that the data structures in the states have specific properties.

A user may allow or disallow properties to be reflected for a data structure. Reflection of data structures and properties of data structures across states may be effected by utilizing BIDs and CIDs corresponding to data structures and properties of data structures. For a property of a data structure to be reflected across states containing the data structure, data structures with a common CID may have the property reflected across them. That is, data structures with a common CID may be given the property. The BID for each data structure in a group of data structures with common CIDs will be different and will allow for the unique identification of data structures in the context of a state. Thus, reflection can be used to populate states with data structures and to provide data structures in states with properties.

In one embodiment, reflection is automatic so that the reflection of data structures in the universe or a state and the reflection of properties of the reflected data structures is automatic across states. Reflection may be user verified, such that a user verifies or accepts reflections or reflections may not be used for some data structures or properties and used for other data structures or properties or a combination of the above is possible and may be accomplished through the use of reflect flags associated with data structures or properties. Reflection allows for scalability in the development of scenarios or initiatives that may model the transformation of systems comprising large numbers of entities. For example, it may be cumbersome or time-consuming to manually instantiate individual data structures in every state and specify the properties of the data structures when only a subset of the data structures or properties of data structures in a succession of states may change from state to state. Thus, reflection may be used to reflect data structures or properties of data structures across one or more states such that data structures or properties do not have to be manually created or modified for every state.

Figure 9:
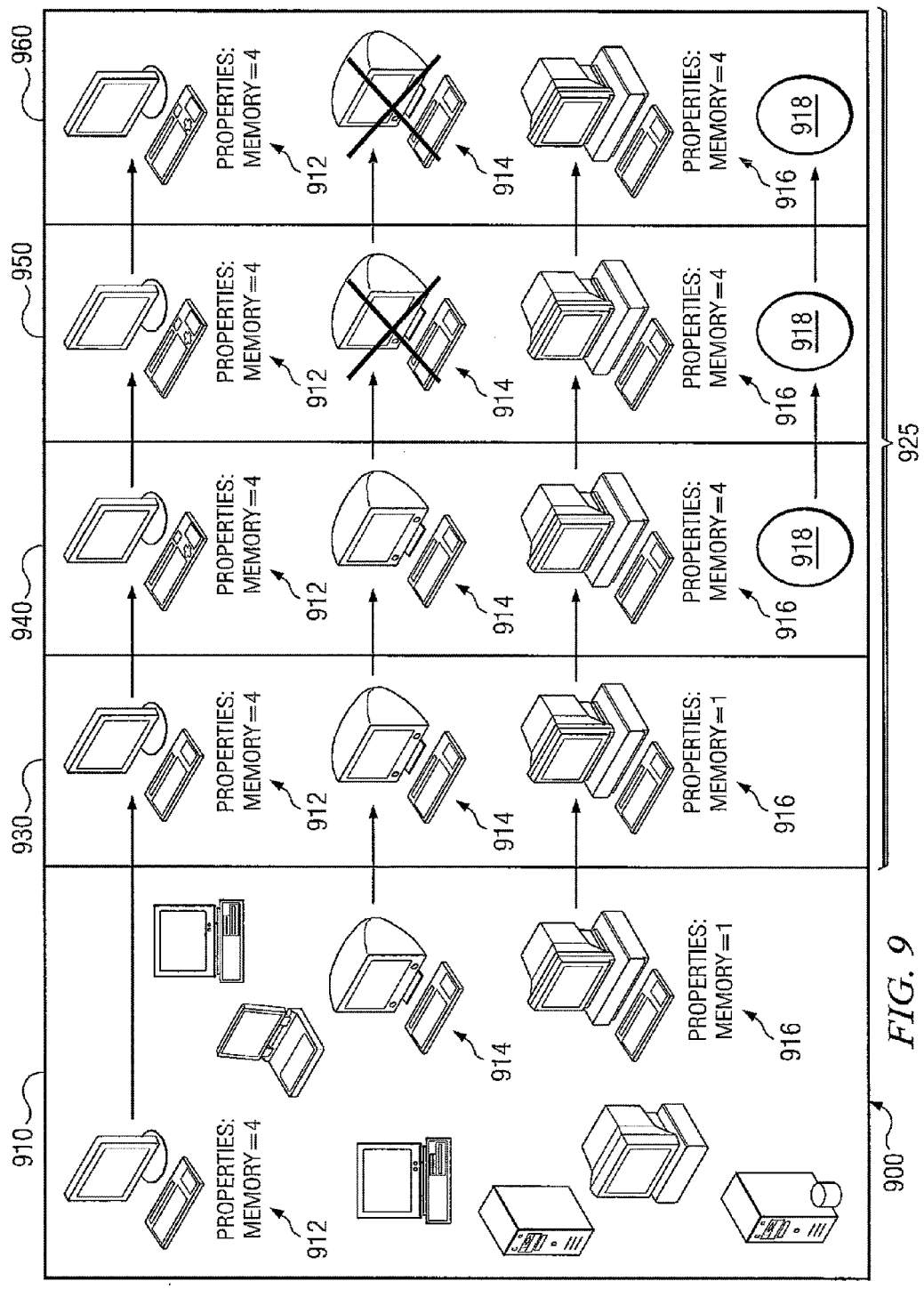
FIG. 9 is a diagrammatic representation of one embodiment of a scenario.

FIG. 9 is an example of the use of reflection. User interface 900 displays graphical universe representation 910 and graphical scenario representation 925, graphical scenario representation 925 comprising graphical state representations 930-960 and modeling the transformation of a system. Graphical universe representation 910 contains graphical representations of data structures representing entities (i.e. various computers) as they exist in the as-is or reality and each graphical representation displays a corresponding set of properties which detail the entity represented by the data structure represented by the graphic representation. The graphical representations displayed in user interface 900 may represent or otherwise correspond to data structures in a repository. Graphical representations 912, 914 and 916 or properties of graphical representations 912, 914 and 916 in graphical universe representation 910 are reflected into a state represented by graphical state representation 930, as denoted by the arcing directional arrows. The properties of the data structures represented by graphical representations in graphical universe representation 910 may be reflected across one or more states of the scenario represented by graphical scenario representation 925 to provide the properties for one or more data structures represented by graphical representations (e.g. graphical computer representation 912, 914 and 916) in graphical state representations 930-960. For example, the memory property (i.e. 4) of a data structure represented by graphical computer representation 912 is reflected from the universe represented by graphical universe representation 910 across the states represented by graphical state representations 930-960 such that the data structure represented by graphical computer representation 912 in graphical state representations 930-960 has the memory property of the data structure represented by graphical computer representation 912 as it exists in the universe represented by graphical universe representation 910. As exemplified by FIG. 9 and the above description, reflection can be used to populate states with data structures and data structures with properties, reducing the effort and time required by a user to create states and initiatives.

States may be utilized to develop other states. More specifically, the data structures populating the state represented by graphical state representation 930 can be used to populate other states. For example, the data structures represented by graphical computer representations 912, 914 and 916 may be reflected into the state represented by graphical state representation 940, or the state represented by graphical state representation 930 may be duplicated to obtain the state represented by graphical state representation 940. Properties of data structures represented by graphical computer representations 912, 914 and 916 can be reflected into the state represented by graphical state representation 930 from the universe represented by graphical universe representation 910. New or different properties may be added to the data structures represented by graphical representations 912, 914 or 916. For example, the memory property of the data structure represented by graphical representation 916 is different in the states represented by graphical state representations 930 and 940. States represented by graphical state representations 950 and 960 may similarly be developed from the universe represented by graphical universe representation 910, or the states represented by graphical state representation 930 or graphical state representation 940 may be reflected from preceding states. For example, the state represented by graphical state representation 930 may be duplicated to obtain the state represented by graphical state representation 950 and properties of data structures may be reflected from data structures of the state represented by graphical state representation 940. Properties of data structures may be modified or data structures added to the state represented by graphical state representation 950 such that graphical state representation 950 displays a desired system. The state represented by graphical state representation 950 may also be developed by duplicating the state represented by graphical state representation 940 to obtain the state represented by graphical state representation 950 and modifying graphical state representation 950 to display a desired system. The state represented by graphical state representation 950 may be augmented with data structures to represent the desired system. Properties of data structures comprising the state represented by graphical state representation 940 may be reflected into the state represented by graphical state representation 950 and these properties may be modified within the state represented by graphical state representation 950 as desired to allow the state represented by graphical state representation 950 to represent a desired system. States may further be developed by querying or otherwise selecting data structures or subsets of data structures in the universe to add to one or more states. Data structures or subsets of data structures added to states may be modified to obtain a desired state or states. Such representations can be reflected across one or more states.

Graphical state representation 950 of FIG. 9 is an example of a graphical state representation representing a state in which a data structure is modified such that it differs from a corresponding data structure contained in the universe represented by graphical universe representation 910 or the previous state as represented by graphical state representation 940. More specifically, in the state represented by graphical state representation 950, the data structure represented by graphical computer representation 914 is end-of-lifed (e.g. terminated, removed, or ceases to exist as part of the system represented by state 950). For example, it may be desirable to retire the computer represented by the data structure represented by graphical computer representation 914 at the state represented by graphical state representation 950 as part of the transformation of a system modeled by the scenario represented by graphical scenario representation 925. To represent this transformation, the data structure represented by graphical computer representation 914 is reflected from the universe represented by graphical universe representation 910 through states represented by graphical state representations 930 and 940 and retired at the state represented by graphical state representation 950. The retirement of the computer represented by the data structure represented by graphical computer representation 914 is represented by the cross over graphical computer representation 914 in graphical state representation 950, thus graphical state representation 950 represents a state containing a data structure indicating that the specific computer represented by the data structure has been retired. The retirement of the computer represented by the data structure represented by graphical computer representation 914 is reflected into the following state, represented by graphical state representation 960, from the state represented by graphical state representation 950, as denoted by the cross over graphical computer representation 914 in graphical state representation 960. The planned retirement, termination or elimination of an entity or relationship may generally be referred to as end-of-lifing the entity or relationship. The end-of-lifing of an entity or relationship—here represented by the cross over graphical computer representation 914—may be reflected across states because the entity may not be end-of-lifed in accordance with a scenario and it may be helpful for a user to see which entities should be end-of-lifed and when.

Similarly, as part of the transformation of a system modeled by the scenario represented by graphical scenario representation 925, it may be desired to upgrade the memory of a computer represented by a data structure represented by graphical computer representation 916. More specifically, at the state represented by graphical state representation 940, the memory property of the data structure represented by graphical computer representation 916 is changed to 4, representing the desired upgrade in the computer represented by the data structure. The state represented by graphical state representation 940 may correspond to a moment in time or a period within the succession of the states represented by graphical state representations 930-960 when it is convenient or resources (e.g. IT personal or memory) are available to upgrade the memory of the computer represented by the data structure represented by computer representation 916. The memory upgrade may be reflected through to the states represented by states 950 and 960 such that computer representation 916 in the subsequent states represented by graphical state representations 950 and 960 display a memory property of 4.

At the moment in time corresponding to the state represented by graphical state representation 940, it may be desirable to add a new computer to the system represented by the state represented by graphical state representation 940. To express this, a data structure represented by graphical computer representation 918 is instantiated in the state represented by graphical state representation 940. The data structure represented by graphical computer representation 918 or properties of the data structure represented by graphical computer representation 918 may be reflected across the states represented by graphical state representations 950 and 960, such that the data structure represented by graphical computer representation 918 exists in subsequent states represented by graphical state representations 950 and 960. As is to be understood from the above example, reflection of data structures and properties of data structures across states allows for the population of states and properties of data structures within states while minimizing the time a user must spend to develop states.

In FIG. 9, the state represented by graphical state representation 960 may represent a desired system, namely a system in which an old computer has been retired, a new computer has been added and the computer memory of a computer upgraded, thus the succession of states represented by graphical state representations 930 through 960 may represent the transformation of a system represented by states represented by graphical state representation 930 to 960. As can be seen from FIG. 9, a succession of states allows a user to design the transformation of a system. The transformation modeled by a succession of states may allow for the design and implementation of an orderly or efficient transformation. For example, in FIG. 9, in the system represented by the states represented by graphical state representations 930-960, it may be desired to have at least 3 computers comprising the system at all times. Thus, a data structure represented by graphical computer representation 918 is instantiated at the state represented by graphical state representation 940, which precedes a state represented by graphical state representation 950 which represents the time at which the computer represented by the data structure represented by graphical computer representation 914 is to be retired, ensuring that the system comprises at least 3 computers.

As discussed above, a method and system for data collection can be used in conjunction with the Troux database to update the Troux database at intervals over time such that the Troux database contains updated data regarding a system. Data collection can be used in conjunction with the Troux database and the reflection of properties and data structures across states to allow a user to monitor the transformation of a system. More particularly, updated data can be reflected across states, updating data structures and properties of data structures. Because changes to a system are reflected in data structures and properties of data structures, a user may monitor the progress towards a desired transformation of a system.

As one example, if data regarding a system or entities of the system is extracted to a data repository such that the repository has updated data and that updated data is then reflected across states comprising a scenario and displayed, a user can view the states and the data structures comprising the states to monitor the progress towards achieving a desired transformation. If the updated properties of the data structures or the data structures comprising one or more states are nearer to a desired state, then a transformation will be closer to being achieved. If the properties of the data structures or the data structures comprising one or more states are further from a desired state than the transformation is in regression and a user monitoring the transformation may be able to rectify the regression.

For example, in an initiative to update the computer memory of computers in a division, data regarding the computer memory of computers in the division may be extracted to a central repository (e.g. the universe) comprising data structures representing the computers and from the central repository reflected through states within a scenario of the initiative. More specifically, data structures representing computers in a progression of states may have a property indicating the size of the computer memory of the computers. If data regarding updates to the size of the computer memory is extracted to the repository and reflected across states and data structures, thus indicating the actual size of the computer memory of the computers represented by the data structures, a user monitoring the states and data structures through a UI will be able to monitor the memory size of the computers and identify computers which need to have updated memories. In addition, the user will also be able to monitor the progression to a desired state and the achievement of the transformation of the system.

In one embodiment, reflection of data structures and properties of data structures across states is achieved through the use of reflect flags which are associated with individual data structures and individual properties of data structures. In particular, each data structure and each property of a data structure has a reflect flag. When the reflect flag is set to Yes, the property or the data structure with the same CID from the immediately preceding state is reflected into a state. If the reflect flag is set to No, the data structure or the property from the preceding state is not reflected into the state. In one embodiment, the reflect flag is initially set to Yes and is set to No when a user modifies the associated property or data structure.

Reflecting changes across states may further be effected through the use of an event log. In one embodiment, a repository may be associated with or comprise an event log. Changes to data in the repository (e.g. in the context of the Troux database, changes to properties or data structures) are recorded in the event log. Changes to data in the repository may occur during data collection or as part of the modification of states by a user. A background thread or other subroutine may awake periodically and reflect changes in the database across states. More specifically, the background thread may awake every 10 seconds and reflect changes recorded in the event log across data structures and properties of data structures having a common CID and whose reflect flags are set to Yes. In one embodiment, changes to a data structure or property in the Troux database are recorded in the event log. In response, changes to data structures or properties may be reflected into one or more blueprints comprising states or data structures. The modification through reflection of data structures or properties in a state or blueprint may be written to the event log. These changes to the event log may be reflected into a subsequent state contained in a different blueprint within the Troux database. Thus, reflection across states utilizing an event log can be a recursive process that may take time to reflect changes across states.

Figure 10:
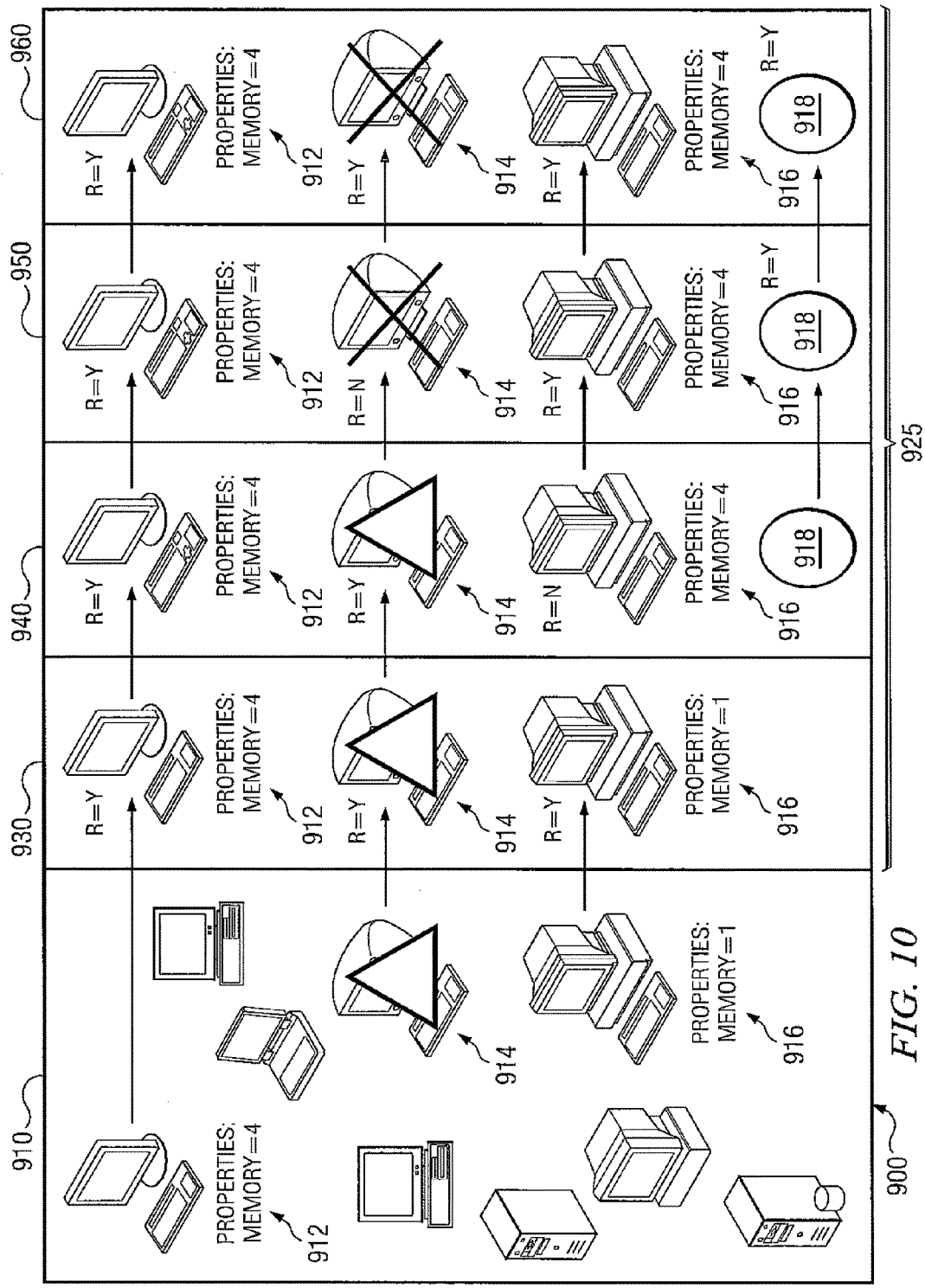
FIG. 10 is a diagrammatic representation of one embodiment of a scenario.

FIG. 10 illustrates one example of how reflection can be utilized to populate states and monitor the transformation of a system represented by the states utilizing reflect flags. For purposes of illustration, in user interface 900 of FIG. 10, the state of the reflect flags of data structures is displayed with regard to the graphical representations of the data structures. In FIG. 10, the universe represented by graphical universe representation 910 may correspond to a data repository such as the Troux database and the repository may be used in conjunction with data collection to be continually updated at intervals over time. Through data collection, data structures representing new entities added to the system or new relationships between or among entities are instantiated in the universe represented by graphical universe representation 910 and properties of data structures representing properties of corresponding entities or relationships in the system are updated. In accordance with one or more reflect flags, updated representations or properties of representations in the universe represented by graphical universe representation 910 may be reflected across the states represented by graphical state representations 930-960 of graphical scenario representation 925.

For example, in user interface 900 of FIG. 10, because the universe represented by graphical universe representation 910 is continually updated at intervals over time, the universe represented by graphical universe representation 910 may contain up-to-date data structures representing entities (e.g. computers) or relationships comprising the system and the data structures may have up-to-date properties. Data structures or properties may be reflected across one or more states in accordance with reflect flags. For example, the reflect flags displayed with regard to graphical computer representation 912 are all set to Yes (i.e. R=Y). Accordingly, in this embodiment, the memory property (i.e. 4) of the data structure represented by graphical computer representation 912 in graphical universe representation 910 is reflected across states represented by graphical state representation 930, 940, 950 and 960 for the data structure represented by graphical computer representation 912.

In user interface 900 of FIG. 10, in the state represented by graphical state representation 950, the data structure represented by graphical computer representation 914 has been manually end-of-lifed by a user. In one embodiment, manual intervention (e.g. modifying a property) terminates the reflection of one or more properties from a previous state and the reflection flags associated with the one or more properties are set to No. Thus, one or more properties of the data structure represented by graphical representation 914 in the state represented by graphical state representation 940 (the immediately preceding state) may not be reflected to the data structure represented by graphical representation 914 in the state represented by graphical state representation 950. For example, the computer represented by the data structure represented by graphical computer representation 914 of graphical universe representation 910 has failed. This is shown in graphical universe representation 910 by the triangular alert over graphical computer representation 914. The notification of failure, shown by the triangular alert symbol in user interface 900, may be reflected to the state represented by graphical state representation 940 such that the triangular alert is displayed with regard to graphical computer representation 914 of graphical state representation 940, alerting a user to the failure of the computer represented by the data structure represented by computer representation 914. However, the failure notification may not be reflected to the data structure represented by graphical computer representation 914 in the state represented by graphical state representation 950 because the reflect flag for that property or the data structure is set to No, breaking the chain of reflection. In certain embodiments, however, a set of data may always be reflected across states. In one example, failure notifications may be in the set of data which is reflected across states regardless of the status of the reflect flag.

Similarly, graphical computer representation 916 is another example of the effects of modifying a property such that a reflect flag is set to No. More specifically, at a state represented by graphical state representation 940, a user has manually changed the value of the memory property to 4, resulting in the reflect flag for that property to be set to No. The memory property of the data structure represented by graphical computer representation 916 in graphical universe representation 910 may be reflected into the data structure represented by graphical computer representation 916 of the state represented by graphical state representation 930 because the reflect flag is set to Yes. The memory property is not reflected from the universe represented by graphical universe representation 910 or the state represented by graphical state representation 930 across the data structure represented by graphical computer representation 916 of the state represented by graphical state representation 940 or the subsequent states because the reflect flag of the data structure represented by graphical computer representation 916 in the state represented by graphical state representation 940 is set to No, preventing the reflection of the memory property from the preceding states or the universe. The reflect flags for the data structures represented by graphical computer representation 916 in states represented by graphical state representations 950 and 960 are still set to Yes. Accordingly, the memory property (i.e. 4) of the data structure represented by graphical computer representation 916 in the state represented by graphical state representation 940 is reflected across the states represented by graphical state representations 950 and 960.

As can be seen by viewing graphical universe representation 910, a data structure represented by graphical computer representation 918 does not exist in the universe. However, a data structure represented by graphical computer representation 918 can be added to the state represented by graphical state representation 940. The data structure represented by graphical computer representation 918 can be created by modifying an existing data structure contained in the universe represented by graphical universe representation 910 or may be developed and designed by a user. The data structure represented by graphical computer representation 918 may be automatically reflected across states represented by graphical state representations 950 and 960, and one or more associated reflect flags may be set to Yes, thus populating the states represented by graphical state representations 950 and 960 with the data structure represented by graphical computer representation 918 and enabling reflection across those states with respect to the data structure represented by graphical computer representation 918.

As described above, user interface 900 can be used to display updated data in the universe to the user and may used to develop a scenario which models a desired transformation over time. Reflection can be used to both allow for the development of scenarios and states (by reflecting data structures and properties of data structures across states) and to update states of a scenario (by reflecting updated data in the universe).

In one embodiment, differencing between states or the universe can be used to generate one or more difference reports which can be used to develop one or more work plans for achieving one or more states. For example, states or representations of states may be compared to determine the differences between the states and what may be achieved in order to achieve a progress from one state to another state. For example, in user interface 900, the state represented by graphical state representation 930 and the state represented by graphical state representation 940 may be compared to determine the differences between the states represented by graphical state representation 930 and graphical state representation 940 so that a report of the action items that may be achieved to progress from the state represented by graphical state representation 930 to the state represented by graphical state representation 940 may be developed. Because the universe represented by graphical universe representation 910 may be periodically updated such that it contains up-to-date data, data structures in the universe represented by graphical universe representation 910 may be differenced with one or more states to determine the differences between the as is and a desired state such that it can be determined what may be achieved to progress to the desired state.

As an alternative or as a supplemental means of monitoring the transformations of one or more systems, updated data collected utilizing data collection can be reflected across all the states, a few of the states or across data structures representing entities or relationships, allowing for a comparison of desired properties against actual properties. Furthermore, parallel views of graphical state representations may display updated data, representations may be selected and upon selection, updated data displayed or any other method may be used to display updated data to a user.

In a further embodiment, users may be alerted to changes in one or more states or the universe. In one embodiment, if the associated data structure or property is changed, the change will be recorded in a report which is made available to a user. In a further embodiment, specific changes are always recorded in the report and as such are available to a user.

Embodiments described above can have additional functionality. For example, in one embodiment, a user may be notified when data is collected which indicates that a system whose transformation is modeled by a scenario has changed such that the system has progressed further towards the effectuation of the transformation. Similarly, the user can be notified if data is collected indicating the system has changed such that the system is further from the effectuation of the planned transformation. A user may also be notified if the transformation of the system does not adhere to the transformation modeled by a scenario. For example, a state may not be achieved at a time corresponding to a time when the state should have been achieved: a user may be notified to this effect. Embodiments may also have functionality to determine conflicts between or among scenarios or initiatives. For example, one scenario of an initiative may result in a transformation of an entity which conflicts with the transformation of the entity modeled by another scenario. A user may be notified or otherwise made aware of such conflicts.

Figure 11:
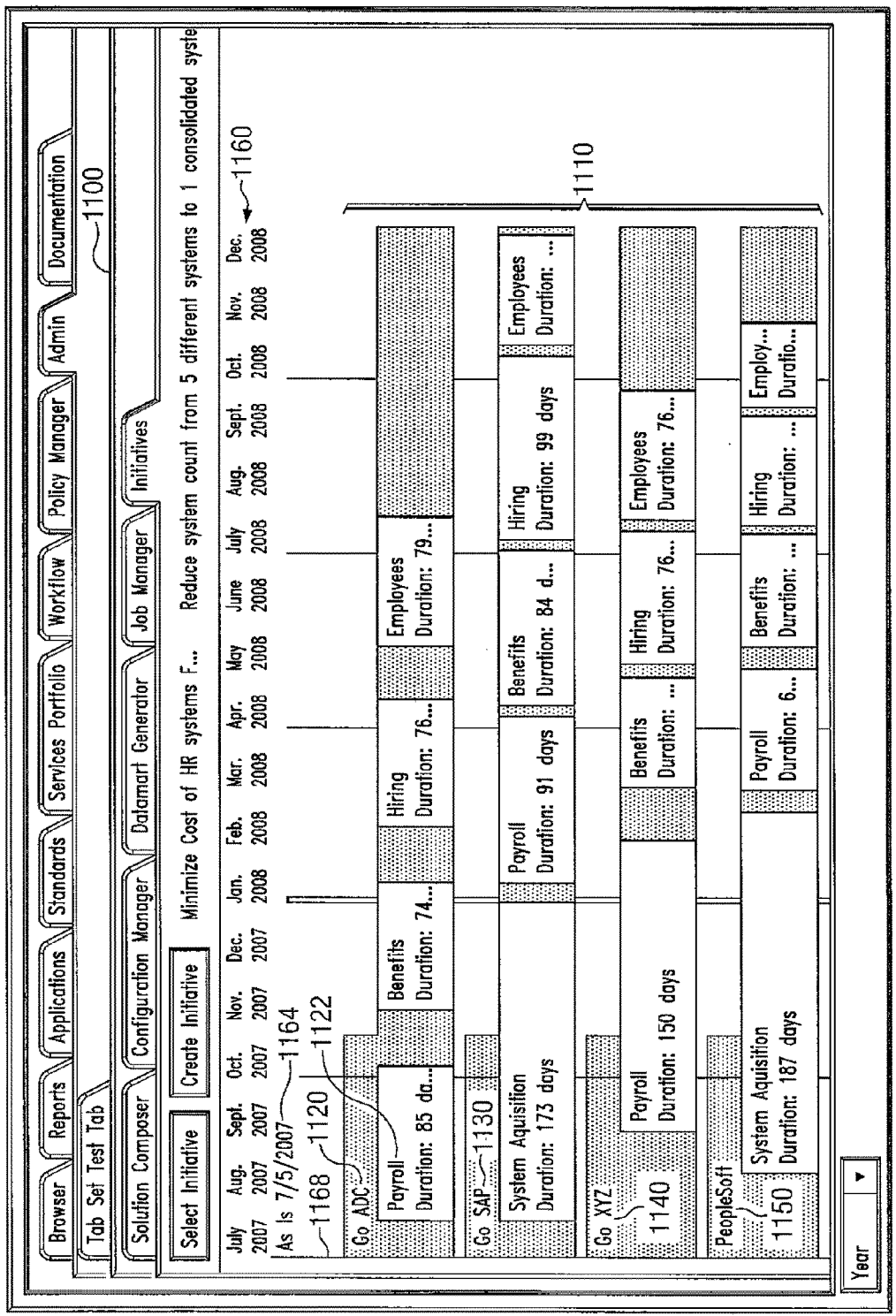
FIG. 11 is a diagrammatic representation of one embodiment of an initiative.

FIG. 11 is a representation of graphical user interface 1100. Graphical user interface 1100 displays human resource (HR) initiative representation 1110 which comprises multiple scenario representations (i.e. Go ABC scenario representation 1120, Go SAP scenario representation 1130, Go XYZ scenario representation 1140 and PeopleSoft scenario representation 1150): each scenario representation of initiative representation 1110 represents a transformation which is desired to reduce HR costs and each scenario representation comprises multiple state representations, each state representation representing a state having a duration and corresponding to intervals over time. Date display 1160 displays a period of time over which state representations representing states comprising a scenario are arranged in a succession. Current date 1164 displays the present date and date indicator 1168 indicates the current date relative to date display 1160 and each scenario representation. In FIG. 11, state representations representing states are arranged in a succession and have a duration for completion such that they span periods of time. For example payroll state representation 1122 represents a state that has a duration of 85 days and is arranged within the scenario represented by scenario representation 1120 such that it corresponds to a period of time which begins in July 2007 and ends in October 2007 relative to the dates shown in date display 1160 as shown by the display of payroll state representation 1122. During the 85 day duration of the state represented by payroll state representation 1122, beginning in July 2007 and ending in October 2007, payroll costs are minimized. The scenario represented by scenario representation 1120 comprises other states, each having a duration such that each state corresponds to a period of time.

Figure 12:
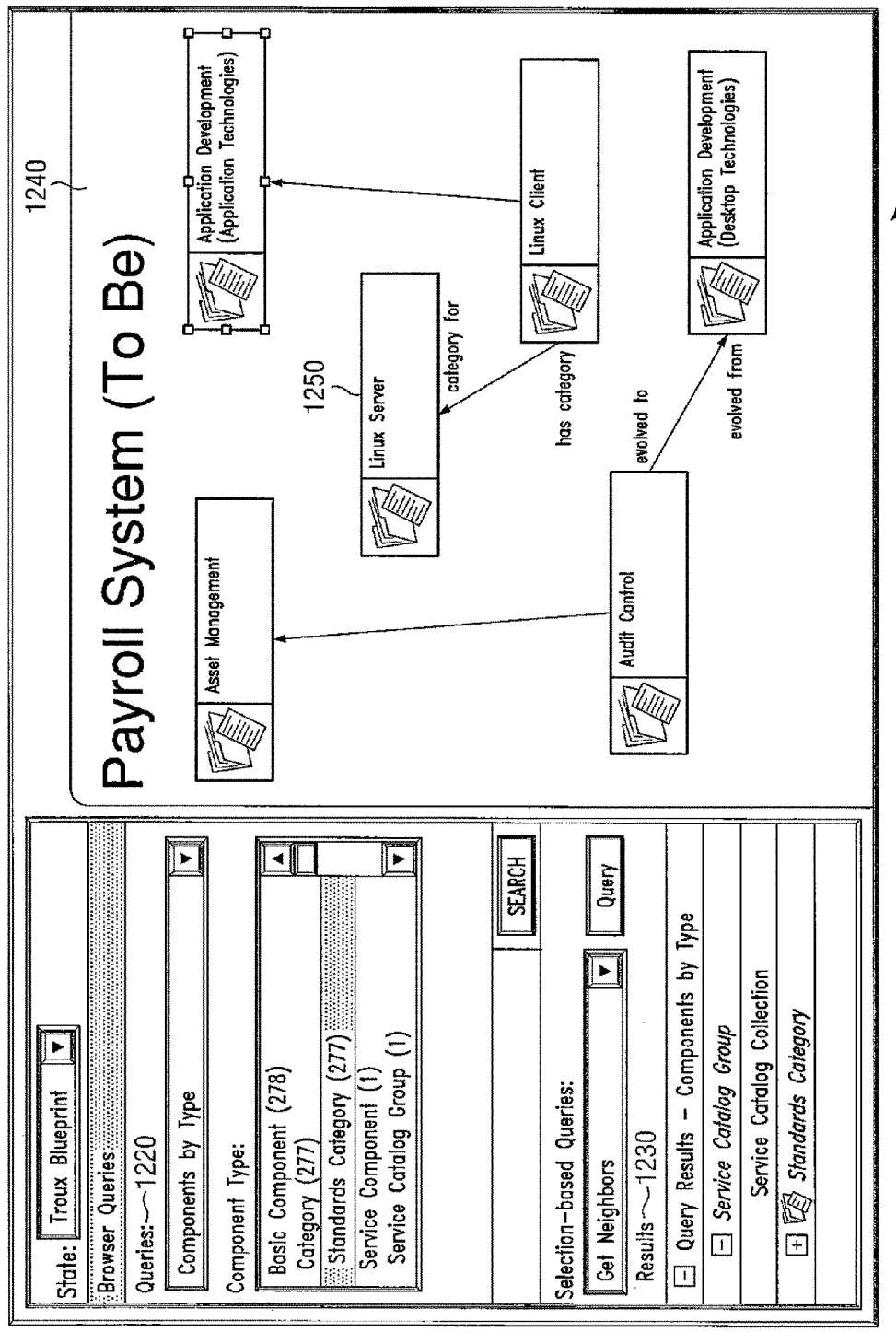
FIG. 12 is a diagrammatic representation of one embodiment of a graphical user interface operable to develop, create, store or manipulate states.

FIG. 12 is an example of a graphical user interface 1200 used to develop one or more states. In user interface 1200, a query interface 1220 is used to query data structures contained in a data repository, e.g. repository 320 of FIG. 3. Results, i.e. a list of data structures, of a query run utilizing query interface 1220 are displayed in results interface 1230. Representations of data structures listed in results interface 1230 may be added to state display 1240, by, for example, selecting a listing representing a data structure in results interface 1230 utilizing a computer mouse operated by a user, to populate a state representation with graphical representations corresponding to data structures representing entities in the system represented by the state. For example, linux server representation 1250 may correspond to a data structure in a repository which represents a linux server. As further shown in state display 1240, relationships may be developed between representations.

As exemplified by FIG. 12, data structures and properties of data structures in a repository can be displayed in a variety of ways. In one embodiment, a computer program can allow for the display of data structures in a variety of forms or representations. For example, data structures can be displayed to a user in a representation appropriate to the task to be performed by the user and changes made by a user to the representation may be stored in the repository. For example, in the context of enterprise architecture, data structures may be displayed as representations common to enterprise architecture that would be understood by an enterprise architect. Any changes to the representations may change the corresponding data structures contained in the repository.

In one example, a modeling tool which allows for the representation of data in different forms or representations is used in conjunction with the Troux database. When used in conjunction with the Troux database, the modeling tool allows for the representation of data structures and properties of data structures in different forms or representations. More specifically, the modeling tool may display data structures or properties of data structures of the Troux database in one or more desired representations which may be selected by a user. For example, a set of data structures may be represented in organizational charts representing the organization of a company or in Business Process Modeling Notation (BPMN) or other forms or representations. Representations of data structures may be used to develop states utilizing a user interface. For example, a state could be developed using data structure representations in BPMN format. The modeling tool may further comprise a querying tool (e.g. query interface 1220 of FIG. 12), which may allow for data structures to be queried and displayed in a user interface in a desired representation or form. When used in conjunction with the Troux database, the modeling tool may query against data structures in the Troux database. The queried data structures and the representations of the queried data structures may be used to develop states, for example, as shown above in the context of graphical user interface 1200 of FIG. 12. Representations of the modeling tool, including representations developed or modified by a user, may be saved to the Troux database and may exist as data structures or properties within the Troux database. In one embodiment, representations in a modeling tool saved to the Troux database may be data structures contained in one or more states of a scenario. Such data structures may have a BID correlating the data structure to a particular state or blueprint and a CID correlating data structures across states.

Systems and methods described above can be used in the context of enterprise architecture to allow for the scalable representation of an enterprise with thousands of component entities. The above described systems and methods can be utilized to design and model the transformation of one or more enterprises (e.g. business, corporation or any other organization) such that the progress of the transformation can be monitored. The Troux database can contain data structures representing entities comprising one or more enterprises or portions (e.g. sections, division or any other subdivision of an enterprise) of enterprises. One or more initiatives modeling the transformation of one or more enterprises or portions of enterprises can be created by a user. Each initiative may comprise one or more scenarios for the transformation of one or more enterprises or portions of enterprises. For example, a scenario may model the transformation of a company to reduce redundancies within the company.

Data structures and properties of data structures in a repository can be displayed in a variety of ways conducive to enterprise architecture. For example, data structures representing entities can be displayed to a user in a form (e.g. BPMN) commonly understood by enterprise architects and changes made by a user to the displayed data structure may be stored in the repository.

Embodiments of systems and methods described above can have additional functionality. For example, in one embodiment, a system may notify a user when data is collected which indicates that an enterprise whose transformation is modeled by a scenario has changed such that the enterprise has progressed further towards the effectuation of the transformation. Similarly, the user can be notified if data is collected indicating the enterprise has changed such that the enterprise is further from the effectuation of the planned transformation. A user may also be notified if the transformation of the enterprise does not adhere to the transformation modeled by a scenario. For example, a state may not be achieved at a time corresponding to a time when the state should have been achieved: a user may be notified to this effect. Additional functionality may exist to allow a user to compare differences between states. Embodiments may also be able to determine conflicts between or among scenarios or initiatives. For example, one scenario of an initiative may result in an enterprise transformation which conflicts with an enterprise transformation modeled by another scenario. A user may be notified or otherwise made aware of such conflicts.

While embodiments have been described in regard to a particular database, other databases may be used. Description with regard to the Troux database or repository 320 is provided by way of example, not limitation.

Embodiments described above can be implemented as one or more computer programs or can be embodied in computer instructions. For example, embodiments may be implemented as a stand alone program, importable engine or as a component or pluggable element of a larger program; such a larger program could be, for example, a database program. Embodiments of such computer programs can be run on more than one computers or processors substantially simultaneously.

While systems and methods disclosed herein have been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method for modeling a transformation of a system, comprising:

receiving, by an apparatus having a transformation engine associated with a data repository and one or more user interfaces, a plurality of desired states for a transformation of a system;

developing, by the transformation engine, a plurality of state data structures, wherein each state data structure represents the system at a time corresponding to a desired state based on the transformation, wherein each state data structure comprises a first set of data structures, wherein each of the first set of data structures associated with a desired state represents an entity or relationship of the system at the corresponding time;

storing the plurality of state data structures in the data repository;

forming a transformation scenario to represent the transformation of the system, wherein the transformation scenario is a data structure comprising the plurality of state data structures, by:

associating the plurality of state data structures;

ordering the plurality of state data structures based on the times corresponding to each of the plurality of state data structures; and associating a first data structure in the first set of data structures of a first state data structure of the plurality of state data structures with a second data structure in the first set of data structures of a second state data structure of the plurality of state data structures using a correlating identity (CID), where the first state data structure represents the system at a first corresponding time, the second state data structure represents the system at a second corresponding time, the first state data structure represents a first entity or relationship of the system at the first corresponding time and the second state data structure represents the first entity or relationship of the system at the second corresponding time; and storing the transformation scenario in the data repository, wherein the plurality of state data structures includes a data structure representing the system in a desired final configuration, wherein the transformation of the system is based on the scenario.

2. The method of claim 1, further comprising reflecting a property of the first data structure and the second data structure across the first state data structure and the second state data structure.

3. The method of claim 2, wherein the property of the first data structure and the second data structure is associated with a reflect flag that determines the reflection of the property across the first state data structure and the second state data structure.

4. The method of claim 1, further comprising collecting data associated with the system at intervals.

5. The method of claim 4, wherein all the data structures are contained in the data repository and collected data is utilized to update one or more data structures in the data repository.

6. The method of claim 1, further comprising displaying a graphical representation of one or more of the states utilizing a modeling tool.

7. A non-transitory computer readable medium storing a set of computer instructions, the computer instructions comprising instructions for:

receiving a plurality of desired states for a transformation of a system;

developing a plurality of state data structures, wherein each state data structure represents the system at a time corresponding to a desired state based on the transformation, wherein each state data structure comprises a first set of data structures, wherein each of the first set of data structures associated with a desired state represents an entity or relationship of the system at the corresponding time;

storing the plurality of state data structures in a data repository;

forming a transformation scenario to represent the transformation of the system, wherein the transformation scenario is a data structure comprising the plurality of state data structures, by:

associating the plurality of state data structures;

ordering the plurality of state data structures based on the times corresponding to each of the plurality of state data structures; and associating a first data structure in the first set of data structures of a first state data structure of the plurality of state data structures with a second data structure in the first set of data structures of a second state data structure of the plurality of state data structures using a correlating identity (CID), where the first state data structure represents the system at a first corresponding time, the second state data structure represents the system at a second corresponding time, the first state data structure represents a first entity or relationship of the system at the first corresponding time and the second state data structure represents the first entity or relationship of the system at the second corresponding time; and storing the transformation scenario in the data repository, wherein the plurality of state data structures includes a data structure representing the system in a desired final configuration, wherein the transformation of the system is based on the scenario.

8. The computer readable medium of claim 7, the instructions further for reflecting a property of the first data structure and the second data structure across the first state data structure and the second state data structure.

9. The computer readable medium of claim 8, wherein the property of the first data structure and the second data structure is associated with a reflect flag that determines the reflection of the property across the first state data structure and the second state data structure.

10. The computer readable medium of claim 7, the instructions further for obtaining data associated with the system collected at intervals.

11. The computer readable medium of claim 10, wherein all the data structures are contained in the data repository and collected data is utilized to update one or more data structures in the data repository.

12. The computer readable medium of claim 7, further comprising a set of instructions for displaying a graphical representation of one or more of the state data structures utilizing a modeling tool.

13. A computing system for monitoring transformations of a system, comprising:

a processor;

a non-transitory computer readable memory, comprising instructions for:

receiving a plurality of desired states for a transformation of a system;

developing a plurality of state data structures, wherein each state data structure represents the system at a time corresponding to a desired state based on the transformation, wherein each state data structure comprises a first set of data structures, wherein each of the first set of data structures associated with a desired state represents an entity or relationship of the system at the corresponding time;

storing the plurality of state data structures in a data repository;

forming a transformation scenario to represent the transformation of the system, wherein the transformation scenario is a data structure comprising the plurality of state data structures, by:
  associating the plurality of state data structures;
  ordering the plurality of state data structures based on the times corresponding to each of the plurality of state data structures; and
  associating a first data structure in the first set of data structures of a first state data structure of the plurality of state data structures with a second data structure in the first set of data structures of a second state data structure of the plurality of state data structures using a correlating identity (CID), where the first state data structure represents the system at a first corresponding time, the second state data structure represents the system at a second corresponding time, the first state data structure represents a first entity or relationship of the system at the first corresponding time and the second state data structure represents the first entity or relationship of the system at the second corresponding time; and
storing the transformation scenario in the data repository, wherein the plurality of state data structures includes a data structure representing the system in a desired final configuration, wherein the transformation of the system is based on the scenario.

14. The system of claim 13, the instructions further for reflecting a property of the first data structure and the second data structure across the first state data structure and the second state data structure.

15. The system of claim 14, wherein the property of the first data structure and the second data structure is associated with a reflect flag that determines the reflection of the property across the first state data structure and the second state data structure.

16. The system of claim 13, the instructions further for obtaining data associated with the system collected at intervals.

17. The system of claim 16, wherein all the data structures are contained in the data repository and collected data is utilized to update one or more data structures in the data repository.

18. The system of claim 13, further comprising a set of instructions for displaying a graphical representation of one or more of the state data structures utilizing a modeling tool.

* * * * *